United States Patent
Ingvalson

(10) Patent No.: US 9,104,752 B2
(45) Date of Patent: Aug. 11, 2015

(54) DATA SHARING AMONG CONDITIONALLY INDEPENDENT PARALLEL FILTERS

(71) Applicant: Honeywell International Inc., Morristown, MN (US)

(72) Inventor: Ryan Ingvalson, Saint Michael, MN (US)

(73) Assignee: Honeywell International Inc., Morristown, NJ (US)

( * ) Notice: Subject to any disclaimer, the term of this patent is extended or adjusted under 35 U.S.C. 154(b) by 231 days.

(21) Appl. No.: 13/679,170

(22) Filed: Nov. 16, 2012

(65) Prior Publication Data

US 2014/0143262 A1 May 22, 2014

(51) Int. Cl.
- *G06F 17/30* (2006.01)
- *G06F 9/54* (2006.01)
- *G06F 15/16* (2006.01)

(52) U.S. Cl.
CPC ........ *G06F 17/30699* (2013.01); *G06F 9/54* (2013.01)

(58) Field of Classification Search
CPC .............................................. G06F 17/30699
USPC ........................................................ 707/754
See application file for complete search history.

(56) References Cited

U.S. PATENT DOCUMENTS

| | | | |
|---|---|---|---|
| 6,323,807 B1 | 11/2001 | Golding et al. | |
| 6,496,816 B1 | 12/2002 | Thiesson et al. | |
| 6,882,959 B2 | 4/2005 | Rui et al. | |
| 7,240,042 B2 | 7/2007 | Cheng et al. | |
| 7,698,108 B2 | 4/2010 | Haney et al. | |
| 7,725,253 B2 | 5/2010 | Foxlin | |
| 7,821,453 B2 | 10/2010 | Wu et al. | |
| 2005/0216182 A1 | 9/2005 | Hussain et al. | |
| 2006/0027404 A1 | 2/2006 | Foxlin | |
| 2006/0064295 A1 | 3/2006 | Schwaiger et al. | |
| 2008/0312833 A1 | 12/2008 | Greene et al. | |
| 2009/0048996 A1 | 2/2009 | Bala | |
| 2010/0017046 A1 | 1/2010 | Cheung et al. | |
| 2010/0274481 A1 | 10/2010 | Krishnaswamy et al. | |
| 2011/0070863 A1 | 3/2011 | Ma et al. | |
| 2012/0021764 A1 | 1/2012 | Enright | |
| 2012/0022784 A1 | 1/2012 | Louis et al. | |
| 2012/0121161 A1 | 5/2012 | Eade et al. | |
| 2012/0243775 A1 | 9/2012 | Ma et al. | |
| 2012/0245844 A1 | 9/2012 | Lommel et al. | |

OTHER PUBLICATIONS

Ingvalson, "Shared State Selection and Data Exchange for Collaborative Navigation Using Conditionally Independent Parallel Filters", U.S. Appl. No. 13/672,337, filed Nov. 8, 2012, pp. 1-40, Published in: US.

(Continued)

*Primary Examiner* — Brittany N Allen

(74) *Attorney, Agent, or Firm* — Fogg & Powers LLC

(57) ABSTRACT

A method for data sharing between conditionally independent filters is provided. The method comprises initializing a plurality of conditionally independent filters operating in parallel, processing data measurements in each of the conditionally independent filters, sharing conditioning node estimates among the conditionally independent filters, merging the shared conditioning node estimates in each of the conditionally independent filters, and performing a conditional update in each of the conditionally independent filters.

20 Claims, 6 Drawing Sheets

(56) References Cited

OTHER PUBLICATIONS

European Patent Office, "Office Action", "from Foreign Counterpart of U.S. Appl. No. 13/053,811", Nov. 5, 2012, pp. 1-8, Published in: EP.
Bahr et al., "Consistent Cooperative Localization", Proceedings of the 2009 IEEE international conference on Robotics and Automation, pp. 4295-4302, May 12-17, 2009, Kobe, Japan.
Chang et al., "MAP Track Fusion Performance Evaluation", "Proceedings of the Fifth International Conference on Information Fusion", Jul. 2002, pp. 512-519, vol. 1.
Fox et al., "A Probabilistic Approach to Collaborative Multi-Robot Localization", "Autonomous Robots", Jun. 2000, pp. 1-25, vol. 8, No. 3.
Frew, "Flight Demonstrations of Self-directed Collaborative Navigation of Small Unmanned Aircraft", Sep. 2004, pp. 1-14, Publisher: American Institute of Aeronautics and Astronautics.
Huang et al., "Observability-based Consistent EKF Estimators for Multi-robot Cooperative Localization", Autonomous Robots, vol. 30, Issue 1, Jan. 2011, pp. 99-122.
Knuth et al., "Distributed Collaborative Localization of Multiple Vehicles from Relative Pose Measurements", "47th Annual Allerton Conference on Communication, Control, and Computing", Jun. 2009, pp. 314-321, Publisher: Allerton, Published in: Monticello, IL.
Kroetsch, "Towards Gaussian Multi-Robot SLAM for Underwater Robotics", Jul. 25, 2005, pp. 1-11.
Moratuwage et al., "Extending Bayesian RFS SLAM framework to Multi-Vehicle SLAM", 2012, pp. 1-6.
Moratuwage et al., "Collaborative Multi-Vehicle Localization and Mapping in Marine Environments", May 2010, pp. 1-6.
Nettleton, "Decentralized SLAM with Low-Bandwidth Communication for Teams of Vehicles", 2006, pp. 1-6.
Petrovskaya et al., "Model Based Vehicle Tracking for Autonomous Driving in Urban Environments", "Autonomous Robots Journal", Apr. 2009, pp. 123-139, vol. 26, No. 2-3.
Pinies et al., "Large Scale SLAM Building Conditionally Independent Local Maps: Application to Monocular Vision", "IEEE Transactions on Robotics", Oct. 2008, pp. 1-13, vol. 24, No. 5, Publisher: IEEE.
Pinies et al., "Scalable SLAM building Conitionally Independent Local Maps", "Proceedings of the 2007 IEEE/RSJ International Conference on Intelligent Robots and Systems", Oct. 29, 2007, pp. 3466-3471.
Riley et al., "Situation Awareness in HRI with Collaborating Remotely Piloted Vehicles", "Proceedings of the Human Factors and Ergonomics Society 49th Annual Meeting", Sep. 2005, pp. 407-411, Publisher: Human Factors and Ergonomics Society.
Roth et al., "Gibbs Likelihoods for Bayesian Tracking", Jun. 2004, pp. 1-8.
Roumeliotis et al., "Distributed Multirobot Localization", "IEEE Transactions on Robotics and Automation", Oct. 2002, pp. 781-795, vol. 18, No. 5.
"Vision Based Navigation and Precision/Dynamic Targeting for Air Vehicles (ImageNav)", "Available at www.virtualacquisitionshowcase.com/document/1301/briefing accessed Mar. 3, 2011", Nov. 2, 2009, pp. 1-5, Publisher: Scientific Systems Company, Inc.
Wang et al., "Simultaneous Localization, Mapping and Moving Object Tracking", Jun. 2007, pp. 1-47, vol. 26, Publisher: International Journal of Robotics Research.
U.S. Patent and Trademark Office, "Notice of Allowance", "Application U.S. Appl. No. 13/672,337", Mar. 14, 2013, pp. 1-20.
U.S. Patent and Trademark Office, "Supplemental Notice of Allowance", "U.S. Appl. No. 13/672,337", Apr. 10, 2013, pp. 1-9.
U.S. Patent and Trademark Office, "Final Office Action", from U.S. Appl. No. 13/053,811, Jul. 23, 2014, pp. 1-12, Published in: US.
U.S. Patent and Trademark Office, "Notice of Allowance", from U.S. Appl. No. 13/053,811, Aug. 8, 2014, pp. 1-5, Published in: US.
U.S. Patent and Trademark Office, "Advisory Action", "from U.S. Appl. No. 13/053,811", Oct. 25, 2013, pp. 1-3, Published in: US.
U.S. Patent and Trademark Office, "Office Action", "U.S. Appl. No. 13/053,811", Apr. 16, 2013, pp. 1-18.
U.S. Patent and Trademark Office, "Final Office Action", "U.S. Appl. No. 13/053,811", Jul. 24, 2013, pp. 1-15.
U.S. Patent and Trademark Office, Office Action, from U.S. Appl. No. 13/053,811, Mar. 6, 2014, pp. 1-19, Published in: US.

DATA SHARING AMONG CONDITIONALLY INDEPENDENT PARALLEL FILTERS

BACKGROUND

There are applications in the field of sensing and estimation where separate and distinct local filters are used to estimate the global state of a system. When these local filters satisfy the property of conditional independence given a set of shared states, information can be passed between filters that allow a distributed and decentralized solution to be maintained, without approximations, that is equivalent to a global central filter. In addition, the filter partitioning resulting from this method has the potential for a reduction in the computation complexity of some applications since the conditionally independent formulation may result in a set of filters each of which is of smaller dimension than a single centralized filter.

One application of this data sharing technique is in Simultaneous Localization and Mapping (SLAM), in which information obtained by a sensor on a mobile platform is processed to obtain an estimate of its own position while building a map of the environment. For example, in a paper by Pinies and Tardos, *Scalable SLAM Building Conditionally Independent Local Maps*, Proceedings of the 2007 IEEE/RSJ International Conference on Intelligent Robots and Systems, pp. 3466-3471, San Diego, Calif. (2007), a submapping solution to the SLAM problem is presented where the submaps are formulated to be conditionally independent of each another. In this approach, a method to share information among submaps that exploits the conditional independence formulation is provided. This data exchange method is termed "back propagation." In this technique, local filters were built up sequentially and the data sharing was done in a single process at the end of a mission. The information in the data sharing process flowed in one direction starting with the most recent local submap and was propagated back through the chain of previous submaps.

The primary limitation with prior approaches such as the back propagation technique is that they do not account for the situations when new information originates from more than one filter (i.e., "submap") simultaneously. Such approaches specifically assume that the currently active submap is the most update-to-date submap. As a result, this submap has the latest and newest information, which means that all information must flow from it backwards through the chain of earlier submaps.

SUMMARY

A method for data sharing between conditionally independent filters is provided. The method comprises initializing a plurality of conditionally independent filters operating in parallel, processing data measurements in each of the conditionally independent filters, sharing conditioning node estimates among the conditionally independent filters, merging the shared conditioning node estimates in each of the conditionally independent filters, and performing a conditional update in each of the conditionally independent filters.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the drawings, in which.

DETAILED DESCRIPTION

Figure 1:
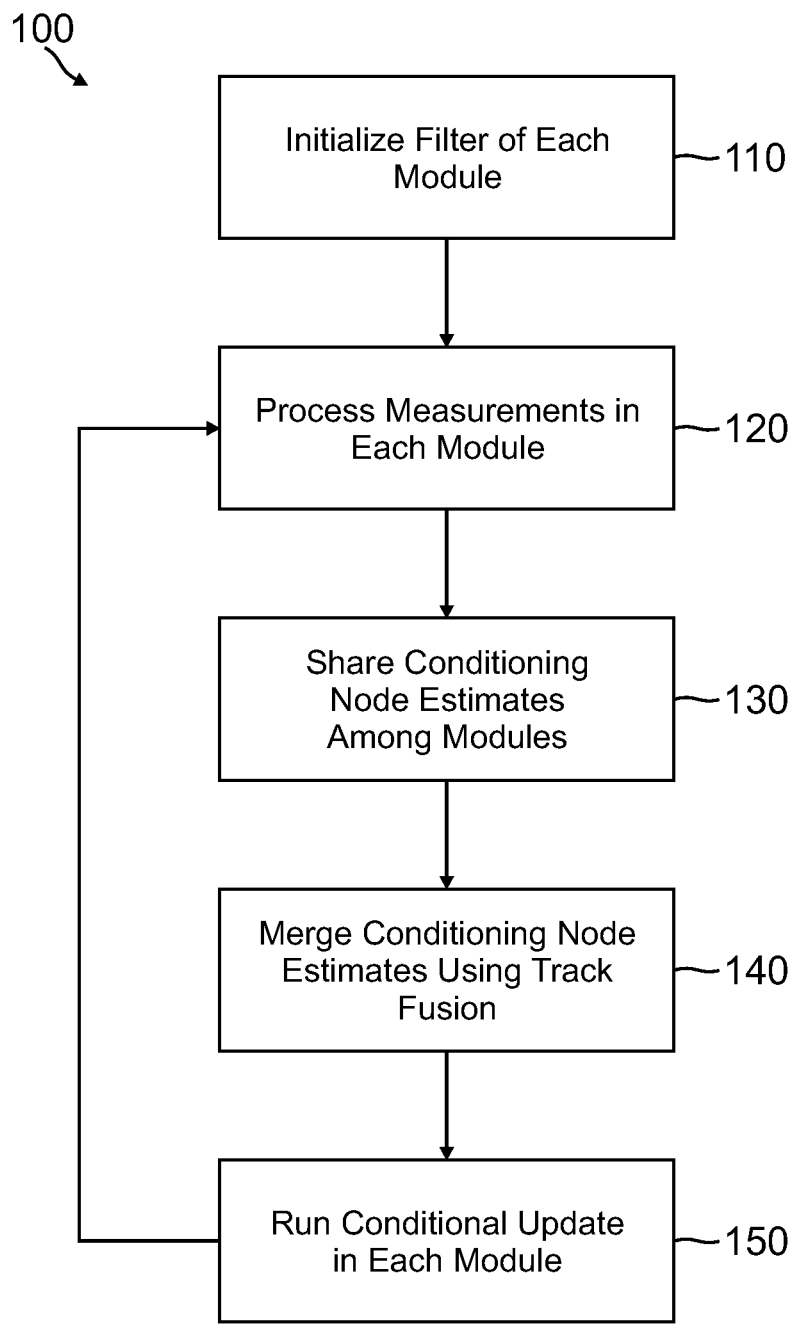
FIG. 1 is a flow diagram of a method for data sharing between conditionally independent parallel filters in a system of filter processing modules.

In the following detailed description, reference is made to the accompanying drawings that form a part hereof, and in which is shown by way of illustration specific exemplary embodiments. It is to be understood, however, that other embodiments may be utilized and that logical, mechanical, and electrical changes may be made.

A method for data sharing in a system of conditionally independent filters operating in parallel is provided, where each parallel filter operates within its own filter processing module. The method generally includes initializing the conditionally independent parallel filters in one or more filter processing modules, processing data measurements in each of the conditionally independent filters, and sharing conditioning node estimates among the conditionally independent filters. The shared conditioning node estimates are then merged in each of the conditionally independent filters, and a "conditional update" (which will be discussed hereafter) is performed in each of the conditionally independent filters.

The present approach solves a more general problem of data exchange in conditionally independent filters (or "submaps") that run in at the same time, that is, in parallel. The parallel filters are formulated to be conditionally independent of one another but also while allowing each parallel filter to process and apply new information (e.g., from local sensor data) simultaneously, where the new information processed by the filter of each module is independent of all the other new information processed within the other modules. Thus, when information is shared it may "collide" with other new information from other modules. This "collision" of information is not addressed in prior approaches. The method described herein addresses this problem. Here forward, the update process in this data exchange methodology will be referred to as the "conditional update" to better describe what the update step is doing in more general terms (as opposed to back propagation). Additionally, in the present nomenclature, the filters of each conditionally independent pair of filters share a common set of states that is referred to as the "conditioning node."

In the present method of data sharing among conditionally independent parallel filters, the direction of new information flow is not restricted to originate from one module at a time. Thus, data exchange can run simultaneously between the parallel filters. The filters described herein can be generally applied to Bayesian tracking filters, including Gaussian filters, which model and estimate the stochastic states of a system.

When two conditionally independent filters need to simultaneously share their new information, it is necessary to merge the estimates of the conditioning node by running a fusion algorithm. Since a conditioning node estimate is simply a set of state estimates, the problem of merging conditioning node estimates from separate filters is a problem of "track fusion." This is in contrast to "sensor fusion" where measurement data from a sensor must be fused with state estimates within a filter. Track fusion deals with the problem of fusing distinct, but correlated, state estimates (i.e. "tracks") that come from separate estimators. This is a well-known problem and many algorithms to solve this have been proposed. Track fusion typically is discussed regarding the fusion of only two tracks at a time, but in general may apply to an arbitrary number of tracks. Some exemplary approaches to track fusion are disclosed in Chang et al., *MAP Track Fusion Performance Evaluation*, Proceedings of the Fifth International Conference on Information Fusion, vol. 1, pp. 512-519 (2002), the disclosure of which is incorporated herein by reference.

FIG. 1 is a flow diagram of a method 100 for data sharing between conditionally independent parallel filters in a system of filter processing modules. At the start of method 100, a filter in each of the modules is initialized (block 110). The modules of the system may represent various vehicles or persons operating in a collaborative network, for example, each of which have a navigation filter in an onboard navigation system; or, as another example, each module may represent a subfilter component of a larger filtering method, such as a hierarchical or federated approach. Although, this method is well suited for distributed and decentralized applications it is not required. For example, modules for each of the conditionally independent filters may each run on the same hardware platform or even in the same processor. The measurements in each of the modules are then processed (block 120). The processed measurements can be based on various sensor data obtained by one or more sensors on the vehicles or persons, for example. A conditioning node estimate is obtained by each of the modules and shared among each of the modules (block 130). The conditioning node estimates can be based on filter states and prior data measurements, for example. The conditioning node estimates are then merged using a track fusion algorithm (block 140). A conditional update is then run for each of the modules (block 150). The foregoing steps are then repeated (starting at block 120) as long as needed to provide for data sharing between the modules.

Figure 2:
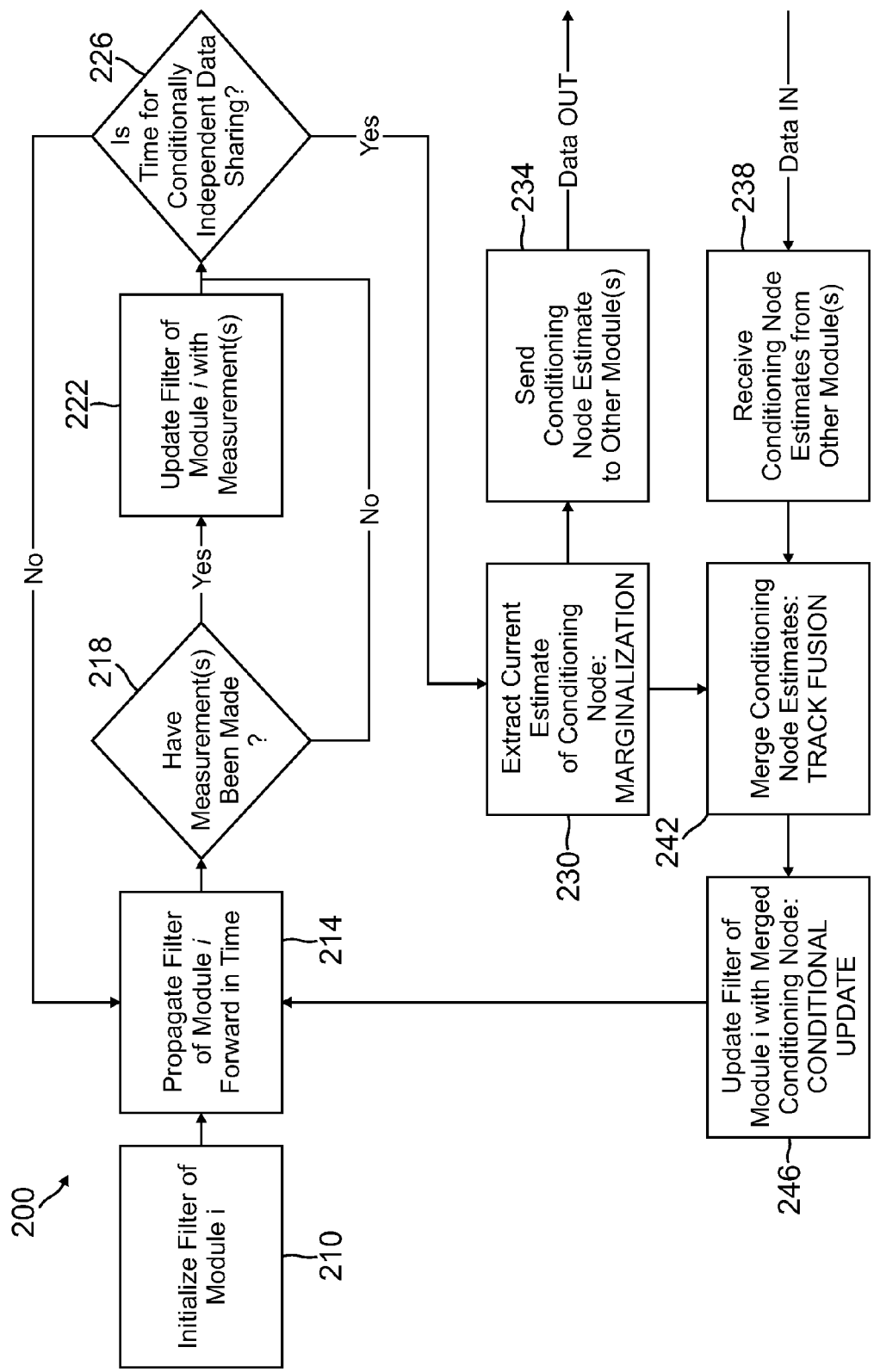
FIG. 2 is a flow diagram of a method that is performed by each conditionally independent filter of a filter processing module to carry out data sharing between parallel filters in a system of filter processing modules.

FIG. 2 is a flow diagram of a method 200 that is performed by each conditionally independent filter of a filter processing module to carry out data sharing between parallel filters in a system of filter processing modules. For example, method 200 can be formed for all filter processing modules i, where i=2 to N number of modules. At the start of method 200, a filter of module i is initialized (block 210), and the filter of module i is propagated forward in time (block 214). The method 200 then determines whether one or more measurements have been made (block 218). If yes, the filter of module i is updated with the measurements (block 222), and a determination is made whether it is time for conditionally independent data sharing (block 226). If measurements have not been made, the method directly determines whether it is time for conditionally independent data sharing (block 226), as no filter update is necessary. If it is not time for conditionally independent data sharing, the foregoing steps are repeated (starting at block 214). When a determination is made that it is time for conditionally independent data sharing (block 226), a current estimate of the conditioning node is extracted by marginalization (block 230). The conditioning node estimate is then sent to one or more other modules in the system at a data output (block 234).

As shown in FIG. 2, module i receives shared conditioning node estimates from the one or more other modules in the system at a data input (block 238). The shared conditioning node estimates are then merged with the conditioning node estimate of module i using a track fusion algorithm (block 242). The filter of module i is then updated with the merged conditioning node estimates to provide a conditional update (block 246). The method 200 is then repeated (starting at block 214) to provide for continuing data sharing as needed.

Figure 3:
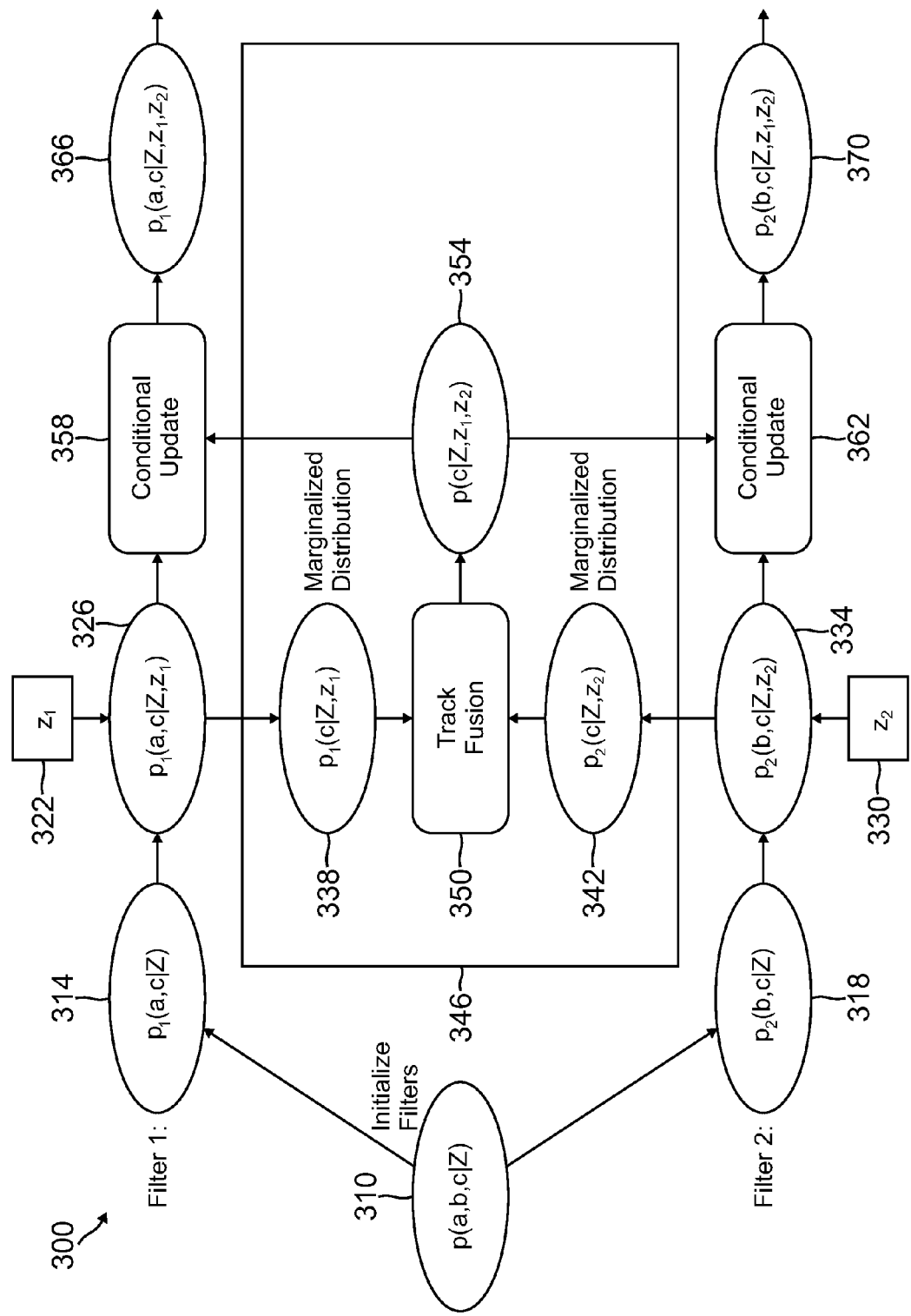
FIG. 3 is a block diagram illustrating conditionally independent data sharing between two conditionally independent parallel filters according to one embodiment.

FIG. 3 is a block diagram illustrating a method 300 for conditionally independent data sharing between two parallel filters according to one embodiment, which shows the interconnections between system variables and various processing blocks for the parallel filters operating simultaneously. The data flows from and to both modules involved in the data sharing step such that data is exchanged in multiple directions during the same update step. The two parallel filter processing modules can be in a system of two platforms, for example, with one filter processing module in each of the platforms. The two parallel filters of each filter processing module are conditionally independent and have the following state vectors:

$$x_1 = [a\ c]^T \text{(first filter)},$$

$$x_2 = [b\ c]^T \text{(second filter)},$$

with joint probability density functions (pdfs):

$$p(x_1) = p(a,c)$$

$$p(x_2) = p(b,c)$$

where a is the unique state(s) of the first filter, b is the unique state(s) of the second filter, and c is the common states between filters 1 and 2. If the density functions are conditionally independent of one another given state c, then:

$$p(a,b|c) = p(a|c) \cdot p(b|c)$$

As shown in FIG. 3, at some point in time the first and second filters are initialized from a common posterior distribution that is conditioned on the measurement set Z ($p(a, b, c|Z)$) at 310. This posterior distribution is marginalized to give a first pdf estimate ($p_1(a, c|Z)$) at 314 for the first filter, and a second pdf estimate ($p_2(b, c|Z)$) at 318 for the second filter. Thereafter, the first filter receives an independent measurement $z_1$ at 322, and its pdf estimate is updated ($p_1(a, c|Z, z_1)$) at 326. Simultaneously, the second filter receives an independent measurement $z_2$ at 330, and its pdf estimate is updated ($p_2(b, c|Z, z_2)$) at 334. Conditioning node estimates in the form of a marginalized distribution 338 ($p_1(c|Z, z_1)$) from the first filter and a marginalized distribution 342 ($p_2(c|Z, z_2)$) from the second filter are then extracted and input into a processing block 346. The marginalized distributions 338 and 342 are merged in a track fusion algorithm 350, which outputs a merged conditioning node estimate ($p(c|Z, z_1, z_2)$) at 354. A conditional update 358 is then run for the first filter with the merged conditioning node estimate. Likewise, a conditional update 362 is run for the second filter with the merged conditioning node estimate. The conditional update 358 produces a globally optimal estimate ($p_1(a, c|Z, z_1, z_2)$) at 366 for the first filter, and the conditional update 362 produces a globally optimal estimate ($p_2(b, c|Z, z_1, z_2)$) at 370 for the second filter. The foregoing steps can be repeated as new measurements are input into the first and second filters.

The present data sharing technique can be implemented in various types of networks. In the context of this invention, the notion of "network" does not refer to the physical layout or architecture of the system, but rather refers to the "network" of probabilistic relationships among the filters of all modules. It is an abstract logical network, not a physical one, but these networks may still be drawn as typical graphs and analyzed with well-known methods of graph theory. It is in this context that the term "network" will be used. The graphs of these networks will be referred to as "dependence networks" or "dependence graphs." While the present technique may be applied most efficiently to dependence graphs of singly-connected networks, it may also be applied to more general cyclic networks. Such dependence networks arise anytime there is a group of filters where the state vectors estimated by each of the filters share states or are related to each other. In these scenarios, it is possible to apply the method of conditionally independent data sharing, if valid and tractable conditioning nodes can be defined for all filter pairs.

Figure 4B:
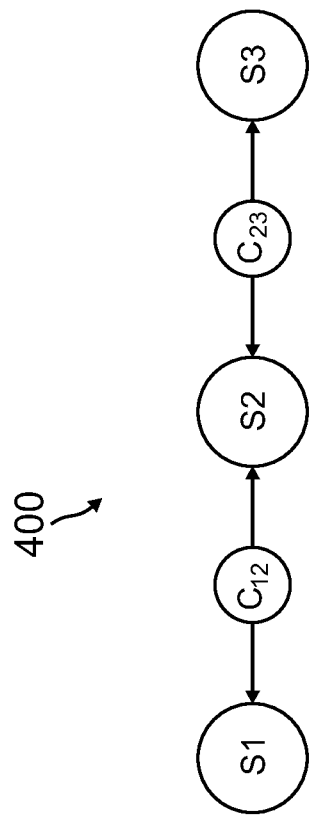
FIGS. 4A and 4B show an exemplary singly-connected line network of conditionally independent filters in which the method for data sharing can be implemented.
Figure 4A:
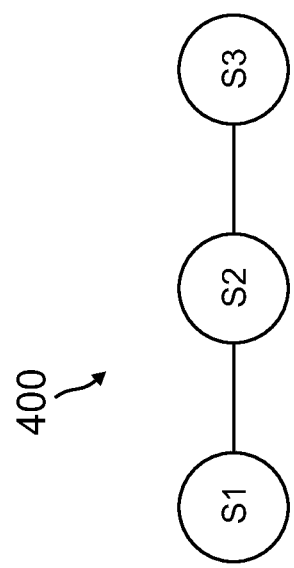

FIG. 4A shows an exemplary network topology dependence graph of a singly-connected line network 400 in which the present data sharing technique can be implemented. This network topology graph is an undirected graph whose edges represent probabilistic dependence links between nodes in the graph. In these graphs, any probabilistic links between modules must be represented in the graph by an edge. If all links are not properly represented in the dependence topology, probabilistic inconsistency will result and may even lead to solution divergence. Probabilistic dependence may arise in a number of ways. For example, suppose there is a collaborative navigation application involving vehicles a and b. A probabilistic link is created between vehicles a and b if there has been at any time a measurement made that simultaneously observes states of both vehicles, such as a relative range measurement. Additionally, in SLAM applications, probabilistic links are formed between filters of each module when those modules each process independent measurements that observe the same landmarks or features (with the additional implicit assumption and those landmarks or features can be associated across the modules). The network 400 includes a plurality of filter modules represented individually as nodes S1, S2, and S3, which are connected serially in the network such that each module's node is directly dependent upon at most two other nodes. The conditioning nodes, once defined, for all modules in network 400 will be unique to each pair of modules. It should be understood that additional module nodes Si can be connected serially in network 400.

FIG. 4B depicts network 400 as a Bayesian network with conditioning nodes $C_{12}$, $C_{23}$ defined and shown. These nodes facilitate the conditional update data exchange methodology. All Bayesian networks are a subset of graphs called directed acyclic graphs (DAGs). The nodes $C_{12}$, $C_{23}$ represent the states that make the filters of nodes S1, S2, and S3 conditionally independent. More generally, a node $C_{ij}$ represents the states that make the filters of nodes Si and Sj in network 400 conditionally independent given $C_{ij}$.

Figure 5B:
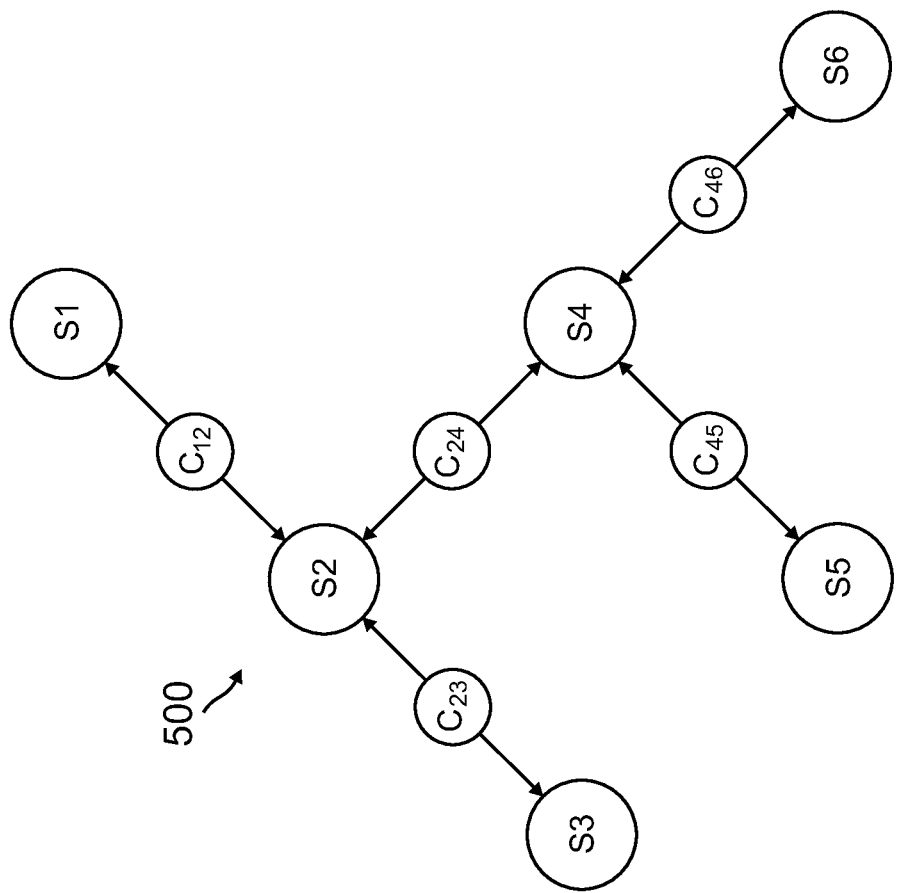
FIGS. 5A and 5B depict an exemplary singly-connected tree network of conditionally independent filters in which the method for data sharing can be implemented.
Figure 5A:
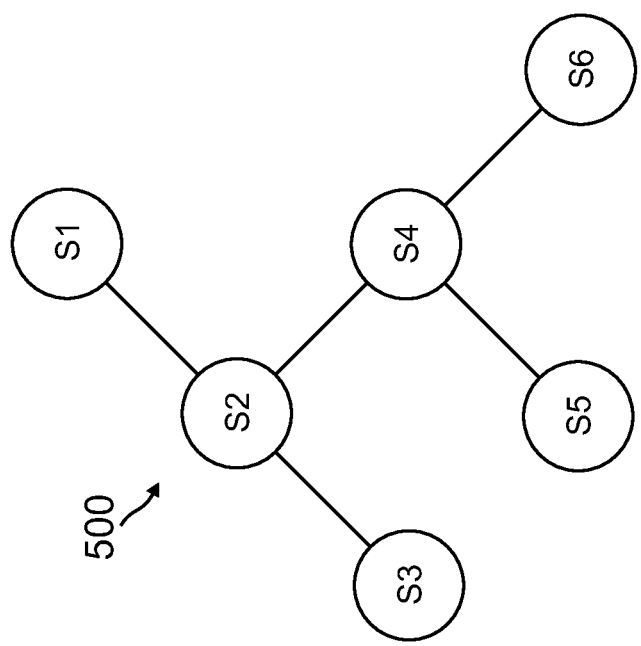

FIG. 5A illustrates an exemplary network topology dependence graph of a singly-connected tree network 500 in which the present data sharing technique can be implemented. This network topology graph is an undirected graph whose edges represent probabilistic dependence links between nodes. The network 500 includes a plurality of module nodes S1, S2, S3, S4, S5, and S6, which are connected such that individual filters may be directly dependent upon an arbitrary number of other filters. There are no cycles in the network, and conditioning nodes are unique to each pair of modules. It should be understood that additional module nodes Si can be connected in network 500 in various configurations as long as the tree structure is preserved.

FIG. 5B depicts network 500 as a Bayesian network DAG with conditioning nodes $C_{12}$, $C_{23}$, $C_{24}$, $C_{45}$, and $C_{46}$ defined and shown. These nodes facilitate the conditional update data exchange methodology. More generally, a node $C_{ij}$ represents the states that make the filters of nodes Si and Sj in network 500 conditionally independent given $C_{ij}$.

Figure 6B:
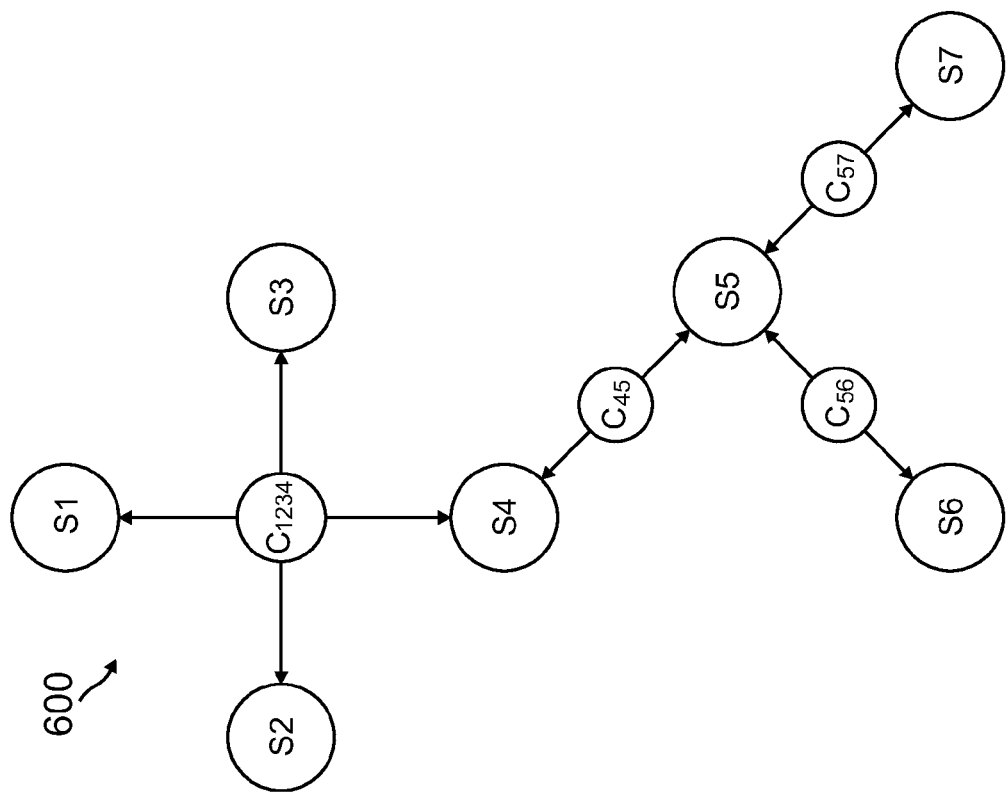
FIGS. 6A and 6B illustrate an exemplary cyclic network of conditionally independent filters in which the method for data sharing can be implemented.
Figure 6A:
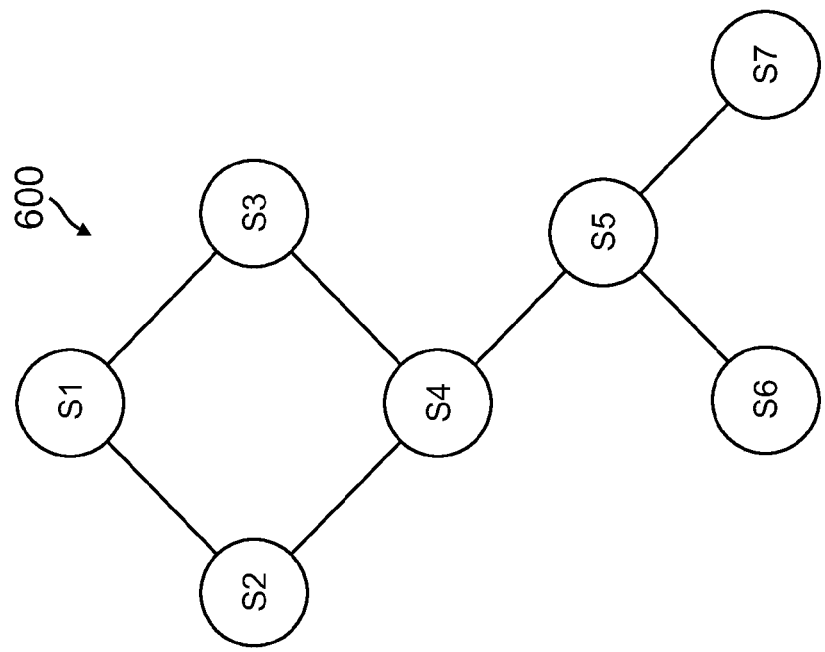

FIG. 6A illustrates an exemplary network topology dependence graph of a cyclic network 600 in which the present data sharing technique can be implemented. Cyclic networks, that is, any network containing at least one cycle, reduce to singly-connected networks in a properly formulated conditionally independent Bayesian network. In network 600, module nodes S1-54 form a cycle, whereas module nodes S5-S7 are singly-connected but are still coupled to the network via the link between nodes S4 and S5. It should be understood that additional module nodes Si can be connected to the network 600 in arbitrary configurations.

FIG. 6B depicts network 600 as a Bayesian network DAG with conditioning nodes $C_{1234}$, $C_{45}$, $C_{56}$, and $C_{57}$ defined and shown. These nodes facilitate the conditional update data exchange methodology. More generally, a node $C_{12\ldots n}$ represents the states that make the filters of nodes S1, S2, ... Sn conditionally independent given $C_{12\ldots n}$ in network 600.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a method for data sharing between conditionally independent filters, the method comprising initializing a plurality of conditionally independent filters operating in parallel, processing data measurements in each of the conditionally independent filters, sharing conditioning node estimates among the conditionally independent filters, merging the shared conditioning node estimates in each of the conditionally independent filters, and performing a conditional update in each of the conditionally independent filters.

Example 2 includes the method of Example 1, wherein the conditionally independent filters each comprise a Bayesian tracking filter for stochastic state estimation.

Example 3 includes the method of Example 2, wherein the Bayesian tracking filter comprises a Gaussian filter.

Example 4 includes the method of any of Examples 1-3, wherein the data measurements are based on sensor data processed by one or more sensors.

Example 5 includes the method of any of Examples 1-4, wherein the conditioning node estimates are based on states and prior data measurements processed in the conditionally independent filters.

Example 6 includes the method of any of Examples 1-5, wherein the shared conditioning node estimates are merged with a track fusion algorithm.

Example 7 includes the method of any of Examples 1-6, wherein each of the conditionally independent filters is located in a separate filter processing module of a plurality of filter processing modules whose filters are related to each other in a dependence network.

Example 8 includes the method of Example 7, wherein the dependence network comprises a singly-connected network.

Example 9 includes the method of any of Examples 1-8, wherein each of the conditionally independent filters is located in a separate filter processing module that is part of a collaborative network.

Example 10 includes a method for data sharing between a first conditionally independent filter operating in parallel with one or more other conditionally independent filters, the method comprising (a) initializing the first conditionally independent filter; (b) propagating the first conditionally independent filter forward in time; (c) determining whether one or more measurements have been made; (d) if one or more measurements have been made, updating the first conditionally independent filter with the measurements, and determining whether it is time for conditionally independent data sharing; (e) if one or more measurements have not been made, determining whether it is time for conditionally independent data sharing; (f) if it is not time for conditionally independent data sharing, repeating the method starting at (b); (g) if it is time for conditionally independent data sharing, extracting a current conditioning node estimate from the first conditionally independent filter; (h) sending the current conditioning node estimate to the one or more other conditionally independent filters; (i) receiving one or more shared conditioning node estimates from the one or more other conditionally independent filters; (j) merging the one or more shared conditioning node estimates with the current conditioning node estimate; and (k) updating the first conditionally independent filter with the merged conditioning node estimates.

Example 11 includes the method of Example 10, wherein the one or more shared conditioning node estimates and the current conditioning node estimate are merged with a track fusion algorithm.

Example 12 includes the method of any of Examples 10-11, wherein each of the first conditionally independent filter and the one or more other conditionally independent filters is located in a separate module of a plurality of modules, where the filters are probabilistically dependent upon one another in a network.

Example 13 includes the method of Example 12, wherein the network comprises a singly-connected network.

Example 14 includes the method of any of Examples 10-13, wherein the method further comprises (1) after updating the first conditionally independent filter with the merged conditioning node estimates, repeating the method starting at (b).

Example 15 includes a computer program product, comprising: a non-transitory computer readable medium having instructions stored thereon executable by a processor to perform a method for data sharing between a first conditionally independent filter operating in parallel with one or more other conditionally independent filters according to Example 10.

Example 16 includes a system for data sharing between conditionally independent filters, the system comprising a first conditionally independent filter, a second conditionally independent filter operating in parallel with the first conditionally independent filter, and one or more processors in operative communication with the first and second conditionally independent filters. The one or more processors are configured to execute processor readable instructions to perform a method for data sharing comprising initializing the first conditionally independent filter and the second conditionally independent filter with the same data measurement set, wherein the first conditionally independent filter has a first probability density function estimate and the second conditionally independent filter has a second probability density function estimate; receiving a first independent measurement at the first conditionally independent filter; updating the first probability density function estimate with the first independent measurement; receiving a second independent measurement at the second conditionally independent filter; updating the second probability density function estimate with the second independent measurement; extracting a conditioning node estimate from the first conditionally independent filter; extracting a conditioning node estimate from the second conditionally independent filter; combining the conditioning node estimates from the first and second conditionally independent filters to produce a merged conditioning node estimate; running a conditional update for the first conditionally independent filter with the merged conditioning node estimate; and running a conditional update for the second conditionally independent filter with the merged conditioning node estimate.

Example 17 includes the system of Example 16, wherein the merged conditioning node estimate is produced using a track fusion algorithm.

Example 18 includes the system of any of Examples 16-17, wherein each of the first and second conditionally independent filters is located in a separate module of a plurality of modules, where the filters are probabilistically dependent upon one another in a network.

Example 19 includes the system of Example 18, wherein the network comprises a singly-connected network.

Example 20 includes the system of any of Examples 16-19, wherein the first conditionally independent filter is located in a first platform of a collaborative network, and the second conditionally independent filter is located in a second platform of the collaborative network.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for data sharing between a plurality of filters, the method comprising:

initializing at least a first filter and a second filter that operate in parallel with each other, the first filter having a first state vector ($x_1$), the second filter having a second state vector ($x_2$), the first filter estimating a distribution of the first state vector that contains a first subset ($x_a$) and a third subset ($x_c$), the second filter estimating a distribution of the second state vector that contains a second subset ($x_b$) and the third subset ($x_c$), such that:

$$x_1 = [_{x_c}{}^{x_a}] \text{ and } x_2 = [_{x_c}{}^{x_b}];$$

wherein:

the first subset includes one or more unique states of the first filter, the second subset includes one or more unique states of the second filter, and the third subset includes one or more common states between the first and second filters;

the first subset, the second subset, and the third subset are selected such that the first subset and the second subset are conditionally independent given the third subset; and the third subset is a conditioning node for the first filter and the second filter;

processing data measurements in the first filter;

sharing conditioning node estimates with the second filter when it is time for conditionally independent data sharing;

merging the shared conditioning node estimates in each of the filters; and performing a conditional update in each of the filters.

2. The method of claim 1, wherein the filters each comprise a Bayesian tracking filter for stochastic state estimation.

3. The method of claim 2, wherein the Bayesian tracking filter comprises a Gaussian filter.

4. The method of claim 1, wherein the data measurements are based on sensor data processed by one or more sensors.

5. The method of claim 1, wherein the conditioning node estimates are based on states and prior data measurements processed in the filters.

6. The method of claim 1, wherein the shared conditioning node estimates are merged with a track fusion algorithm.

7. The method of claim 1, wherein each of the filters is located in a separate filter processing module of a plurality of filter processing modules whose filters are related to each other in a dependence network.

8. The method of claim 7, wherein the dependence network comprises a singly-connected network.

9. The method of claim 1, wherein each of the filters is located in a separate filter processing module that is part of a collaborative network.

10. A method for data sharing between a plurality of filters, the method comprising:

(a) initializing at least a first filter and a second filter that operate in parallel with each other, the first filter having a first state vector ($x_1$) the second filter having a second state vector ($x_2$), the first filter estimating a distribution of the first state vector that contains a first subset ($x_a$) and a third subset ($x_c$), the second filter estimating a distribution of the second state vector that contains a second subset ($x_b$) and the third subset ($x_c$), such that:

$$x_1 = [_{x_c}{}^{x_a}] \text{ and } x_2 = [_{x_c}{}^{x_b}];$$

wherein:

the first subset includes one or more unique states of the first filter, the second subset includes one or more unique states of the second filter, and the third subset includes one or more common states between the first and second filters;

the first subset, the second subset, and the third subset are selected such that the first subset and the second subset are conditionally independent given the third subset; and the third subset is a conditioning node for the first filter and the second filter;

(b) propagating the first filter forward in time;

(c) determining whether one or more measurements have been made;

(d) if one or more measurements have been made: (i) updating the first filter with the measurements; and (ii) determining whether it is time for conditionally independent data sharing;

(e) if one or more measurements have not been made, determining whether it is time for conditionally independent data sharing;

(f) if it is not time for conditionally independent data sharing, repeating the method starting at (b);

(g) if it is time for conditionally independent data sharing, extracting a current conditioning node estimate from the first filter;

(h) sending the current conditioning node estimate to the second filter;

(i) receiving one or more shared conditioning node estimates from the second filter;

(j) merging the one or more shared conditioning node estimates with the current conditioning node estimate; and (k) updating the first filter with the merged conditioning node estimates.

11. The method of claim 10, wherein the one or more shared conditioning node estimates and the current conditioning node estimate are merged with a track fusion algorithm.

12. The method of claim 10, wherein each of the first filter and the second filter is located in a separate module of a plurality of modules, where the filters are probabilistically dependent upon one another in a network.

13. The method of claim 12, wherein the network comprises a singly-connected network.

14. The method of claim 10, wherein the method further comprises: (I) after updating the first filter with the merged conditioning node estimates, repeating the method starting at (b).

15. A computer program product, comprising: a non-transitory computer readable medium having instructions stored thereon executable by a processor to perform a method for data sharing between a plurality of filters according to claim 10.

16. A system for data sharing between a plurality of filters, the system comprising:

a first filter;

at least a second filter operating in parallel with the first filter;

wherein the first filter has a first state vector ($x_1$), the second filter has a second state vector ($x_2$), the first filter estimates a distribution of the first state vector that contains a first subset ($x_a$) and a third subset ($x_c$), the second filter estimates a distribution of the second state vector that contains a second subset ($x_b$) and the third subset ($x_c$), such that:

$$x_1 = [_{x_c}{}^{x_a}] \text{ and } x_2 = [_{x_c}{}^{x_b}];$$

wherein:

the first subset includes one or more unique states of the first filter, the second subset includes one or more unique states of the second filter, and the third subset includes one or more common states between the first and second filters;
the first subset, the second subset, and the third subset are selected such that the first subset and the second subset are conditionally independent given the third subset; and
the third subset is a conditioning node for the first filter and the second filter;
one or more processors in operative communication with the first and second filters;
a non-transitory computer readable medium having instructions stored thereon executable by the one or more processors to perform a method for data sharing comprising:
initializing the first filter and the second filter with the same data measurement set, wherein the first filter has a first probability density function estimate and the second filter has a second probability density function estimate;
receiving a first independent measurement at the first filter;
updating the first probability density function estimate with the first independent measurement;
receiving a second independent measurement at the second filter;
updating the second probability density function estimate with the second independent measurement;
extracting a conditioning node estimate from the first filter;
extracting a conditioning node estimate from the second filter;
combining the conditioning node estimates from the first and second filters to produce a merged conditioning node estimate;
running a conditional update for the first filter with the merged conditioning node estimate; and
running a conditional update for the second filter with the merged conditioning node estimate.

17. The system of claim 16, wherein the merged conditioning node estimate is produced using a track fusion algorithm.

18. The system of claim 16, wherein each of the first and second filters is located in a separate module of a plurality of modules, where the filters are probabilistically dependent upon one another in a network.

19. The system of claim 18, wherein the network comprises a singly-connected network.

20. The system of claim 16, wherein the first filter is located in a first platform of a collaborative network, and the second filter is located in a second platform of the collaborative network.

* * * * *